(12) United States Patent
Chapus et al.

(10) Patent No.: US 10,190,059 B2
(45) Date of Patent: Jan. 29, 2019

(54) PROCESS FOR THE HYDROTREATMENT OF RENEWABLE MATERIALS, WITH AN OPTIMIZED GAS RECYCLE

(71) Applicant: IFP Energies Nouvelles, Rueil-Malmaison (FR)

(72) Inventors: Thierry Chapus, Lyons (FR); Frederic Bazer-Bachi, Irigny (FR); Elodie Tellier, Lyons (FR); Yves Scharff, Montesson (FR); Stephane Fedou, Paris (FR); Octavio Carvalho, Paris (FR); Sebastien Boucher, Chatou (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 19 days.

(21) Appl. No.: 15/217,071

(22) Filed: Jul. 22, 2016

(65) Prior Publication Data

US 2017/0022424 A1 Jan. 26, 2017

(30) Foreign Application Priority Data

Jul. 24, 2015 (FR) .................................. 15 57053

(51) Int. Cl.
*C10G 3/00* (2006.01)
*C10G 45/62* (2006.01)
(Continued)

(52) U.S. Cl.
CPC ................. *C10G 3/50* (2013.01); *C10G 3/46* (2013.01); *C10G 3/52* (2013.01); *C10G 3/54* (2013.01);
(Continued)

(58) Field of Classification Search
CPC ........................................................ C10G 3/60
See application file for complete search history.

(56) References Cited

U.S. PATENT DOCUMENTS 8,304,592 B2* 11/2012 Luebke ................. C10G 45/04
585/265
8,809,610 B2* 8/2014 Van Beijnum ......... C10G 45/02
44/605
(Continued)

FOREIGN PATENT DOCUMENTS

EP  1741768 A1  1/2007
EP  2428547 A1  3/2012

OTHER PUBLICATIONS

Search Report dated Jun. 7, 2016 issued in corresponding FR 1557053 application (2 pages).

*Primary Examiner* — Philip Y Louie
*Assistant Examiner* — Alyssa L Cepluch
(74) *Attorney, Agent, or Firm* — Millen White Zelano & Branigan, PC

(57) ABSTRACT

A process for the hydrotreatment of a feed obtained from renewable sources in which the total stream of feed F is divided into a number of different part-streams of feed F1 to Fn equal to the number of catalytic zones n, where n is 1 to 10. The mass flow rate of hydrogen sent to the first catalytic zone represents more than 80% by weight of the total mass flow rate of hydrogen used. The effluent from the reactor outlet undergoes at least one separation step. A portion of the liquid fraction is recycled to the catalytic zones in a manner such that the local recycle ratio for each of the beds is 2 or less, and the local dilution ratio over each of the beds is less than 4.

24 Claims, 2 Drawing Sheets

(51) Int. Cl.
  *C10G 49/00* (2006.01)
  *C10G 65/04* (2006.01)
  *C10L 1/04* (2006.01)
  *C10L 1/06* (2006.01)
  *C10L 1/08* (2006.01)

(52) U.S. Cl.
  CPC ............... *C10G 3/60* (2013.01); *C10G 45/62* (2013.01); *C10G 49/002* (2013.01); *C10G 65/043* (2013.01); *C10L 1/04* (2013.01); *C10L 1/06* (2013.01); *C10L 1/08* (2013.01); *C10G 2300/1014* (2013.01); *C10G 2300/1018* (2013.01); *C10G 2300/202* (2013.01); *C10G 2300/4081* (2013.01); *C10G 2300/42* (2013.01); *C10G 2400/02* (2013.01); *C10G 2400/04* (2013.01); *C10G 2400/08* (2013.01); *C10L 2200/0469* (2013.01); *C10L 2270/023* (2013.01); *C10L 2270/026* (2013.01); *C10L 2270/04* (2013.01); *C10L 2290/10* (2013.01); *Y02P 30/20* (2015.11)

(56) References Cited

U.S. PATENT DOCUMENTS

| | | |
|---|---|---|
| 8,962,905 B2 | 2/2015 | Chapus et al. |
| 2012/0004479 A1 | 1/2012 | Hanks et al. |
| 2012/0059209 A1 | 3/2012 | Chapus et al. |
| 2012/0165581 A1* | 6/2012 | Dupassieux ............ C10G 3/42 585/240 |
| 2012/0184792 A1* | 7/2012 | Solantie ................ B01J 8/0492 585/733 |

\* cited by examiner

PROCESS FOR THE HYDROTREATMENT OF RENEWABLE MATERIALS, WITH AN OPTIMIZED GAS RECYCLE

FIELD OF THE INVENTION

The invention relates to a process for the production of paraffinic hydrocarbons, for use as fuels from renewable materials such as oils and fats of vegetable or animal origin.

The current international context is marked firstly by the rapid increase in the need for fuels, in particular gas oil bases and kerosenes, and secondly by the scale of the problems linked to global warming and the emission of greenhouse gases. This has led to a desire to reduce the energy dependence as regards raw materials of fossil origin and to reduce $CO_2$ emissions. In this context, the search for novel feeds obtained from renewable sources constitutes an increasingly important challenge. Examples of feeds of this type which may be cited are vegetable oils (food or otherwise) or oils obtained from algae, and animal fats.

These feeds are principally composed of triglycerides and free fatty acids, these molecules comprising chains of fatty acid hydrocarbons containing in the range 4 to 24 carbon atoms, and generally with a number of unsaturated bonds in the range 0 to 3, with higher numbers for algal oils, for example. The renewable feeds contain impurities such as nitrogen-containing compounds, and metals in the form of phospholipids containing elements such as phosphorus, calcium, magnesium, iron, potassium and sodium.

The very high molecular mass (>600 g/mol) of triglycerides and the high viscosity of the feeds under consideration mean that using them directly or as a mixture in fuel bases is problematic for modern engines. However, the hydrocarbon chains which constitute the triglycerides are essentially linear and their length (number of carbon atoms) is compatible with the hydrocarbons present in the fuel bases.

Thus, it is necessary to transform these feeds in order to obtain good quality fuel bases (including diesel and kerosene), in particular directly complying with specifications or complying after mixing with other cuts obtained from crude oil. Diesel has to comply with specification EN590, and kerosene has to comply with the requirements defined in the "International Air Transport Association (IATA) Guidance Material for Aviation Turbine Fuel Specifications", such as ASTM D1655.

One possible strategy is the catalytic transformation of triglycerides into deoxygenated paraffin fuel in the presence of hydrogen (hydrotreatment).

During hydrotreatment, the reactions undergone by a feed containing triglycerides are as follows:
- the reaction for hydrogenation of the unsaturated bonds of the hydrocarbon chains of the fatty acids of the triglycerides and esters,
- deoxygenation reactions in accordance with two reaction pathways:
  - hydrodeoxygenation (HDO), leading to the formation of water by consumption of hydrogen and the formation of hydrocarbons with a number of carbon atoms (Cn) equal to that of the initial fatty acid chains,
  - decarboxylation/decarbonylation, leading to the formation of oxides of carbon (carbon monoxide and dioxide: CO and $CO_2$) and to the formation of hydrocarbons with one fewer carbon atoms (Cn−1) compared with the initial fatty acid chains,
- hydrodenitrogenation reactions (HDN), which denotes reactions which can remove nitrogen from the feed with the production of $NH_3$.

The hydrogenation of the unsaturated bonds of hydrocarbon chains (carbon-carbon double bonds) is highly exothermic and the increase in temperature caused by the release of heat can result in temperatures at which the fraction of decarboxylation reactions becomes significant. Hydrodeoxygenation reactions and decarboxylation reactions are also exothermic reactions. Hydrodeoxygenation is generally favoured at a lower temperature than decarboxylation/decarbonylation, which results in a loss of yield. Hydrodenitrogenation reactions are more difficult and necessitate higher temperatures than those for hydrogenation and hydrodeoxygenation.

As a consequence, strict control of the temperature in the hydrotreatment section is necessary, as too high a temperature could suffer from the disadvantage of favouring unwanted secondary reactions such as polymerization, cracking, coke deposition and catalyst deactivation.

PRIOR ART

Thus, the document EP 1 741 768 A1, which describes a process for the hydrotreatment of a feed comprising a fresh vegetable oil feed which contains more than 5% by weight of free fatty acids, generates unwanted reactions. In order to attenuate this problem, a process for the production of gas oil is proposed in which a feed is hydrotreated then isomerized, said feed comprising a fresh feed containing more than 5% by weight of free fatty acids and at least one diluting agent, the hydrotreatment step being carried out at a temperature in the range 200° C. to 400° C. and the ratio of the diluting agent to the fresh feed being in the range 5 to 30 by weight. The diluting agent may be a hydrocarbon compound of biological origin or otherwise and is preferably a recycled product obtained from the process. The document EP 1 741 768 A1 also describes that the quantity of fresh feed (vegetable oil) in the total feed entering the hydrotreatment step is less than 20% by weight.

Thus, it is argued that the very large dilution of the fresh feed before it is hydrotreated can be used to reduce the production of products obtained from secondary reactions and improve the service life of the catalyst in order to provide stable operating conditions for approximately 9 months.

However, the process proposed in the document EP 1 741 768 A1 suffers from the following disadvantages:
- the quantity of recycle to provide the necessary quantity of diluting agent is very high. Using a high flow rate of liquid results in a high pressure drop and requires existing units to be modified in order to adapt them to the dimensions of the reactor that are required,
- the hydrogen consumption is reduced by promoting deoxygenation by decarboxylation reactions (formation of CO and $CO_2$) by appropriate selection of the hydrotreatment catalyst. However, the deoxygenation of triglycerides by decarboxylation brings about a large loss in the paraffin yield, a loss of catalyst activity due to the inhibiting effect of CO and increased corrosion due to the presence of $CO_2$.

The document US2009/0318737 describes a process for the production of fuels (diesel) obtained from renewable starting materials such as oils and fats of vegetable and animal origin. The process consists of treating a first portion of a renewable starting material by hydrogenation and by deoxygenation in a first reaction zone, and a second portion of a renewable starting material by hydrogenation and by deoxygenation in a second reaction zone. A portion of the hydrocarbon liquid product obtained is recycled to the first reaction zone to increase the hydrogen solubility of the reaction mixture by using a recycle ratio for the first portion of the renewable starting materials in the range 2 to 8 by volume (weight ratio in the range 1.7 to 6.9). The document US2009/0318737 thus describes a local recycle ratio over the first bed in the range 2 to 8 by volume (weight ratio in the range 1.7 to 6.9). The fact that the quantity of hydrogen in the liquid phase is maximized means that the rate of deactivation of the catalyst can be reduced, which means that the pressure can be reduced, decarboxylation/decarbonylation reactions are favoured and the hydrodeoxygenation reactions are reduced, and thus the hydrogen consumption is reduced. No information is provided regarding the quantity of nitrogen in the starting materials and the paraffinic effluents.

The document US2009/0082606 describes a process for the production of gas oil from feeds obtained from renewable sources such as vegetable oils. The process consists of treating said feed in a reaction zone by hydrogenation and by deoxygenation in the presence of hydrogen in order to produce paraffins containing 8 to 24 carbon atoms. A portion of the liquid reaction product is recycled to the reaction zone at a recycle ratio to the feed in the range 2 to 8 by volume (weight ratio between 1.7 and 6.9). The liquid portion of the reaction product is recycled to the reaction zone after separation of the gaseous compounds. The document US2009/0082606 thus describes a liquid recycle ratio in the range 2 to 8 by volume or between 1.7 and 6.9 (by weight).

The application EP 2 226 375 A1 describes a continuous process for the hydrogenation of a feed obtained from renewable sources containing triglycerides in a fixed bed reactor system containing a plurality of catalytic beds comprising a hydrogenation catalyst disposed in series, in which the feed, the hydrogen-containing gas and a diluting agent are injected into the catalytic beds under hydrogenation conditions. The feed is introduced by staged injection in a manner such that the various catalytic beds receive more and more feed in the direction of flow. The diluting agent is only added to the stream of feed and hydrogen-containing gas entering the first catalytic bed, the diluting agent being composed of the hydrogenation product formed in each catalytic bed in addition to the diluting agent which is added, which is a fraction of the hydrogenated product obtained by the process of the invention and which is recovered from the reactor outlet after separation. This limitation to the quantity of product recycled to the reactor limits the total flow rate in the reactor, then the hydraulic head downstream of the reactor. Thus, the first catalytic bed is supplied with a mixture constituted by a part-stream of feed F1, a part-stream of hydrogen-containing gas H1 and the recycled liquid diluting agent. The second catalytic bed is supplied with a mixture constituted by a part-stream of feed F2, a part-stream of hydrogen-containing gas H2 as well as the hydrogenated product obtained from bed 1, gas containing unreacted hydrogen and the diluting agent added to the inlet to bed 1. The ratio by weight of diluting agent to the feed is essentially the same at the inlet to all of the catalytic beds and is 4 or less. The application EP 2 226 375 A1 thus describes a dilution ratio for each bed which only takes into account the liquid streams and does not take the gas streams into account.

The use of a high liquid recycle ratio is known to provide for better management of the exothermicity, and in particular to maintain the difference in temperature between the outlet temperature and the inlet temperature for each catalytic zone within an acceptable range for the industrial operation of the process.

However, the Applicant has demonstrated that a process for the hydrotreatment of feeds obtained from renewable sources using a staged injection of feed into the various catalytic zones can be used to provide good management of the exothermicity without in any way imposing a high liquid recycle in the various catalytic zones, because of the mass flow rate of hydrogen sent to the first catalytic zone which represents more than 80% by weight of the total mass flow rate of hydrogen used in the hydrotreatment process.

SUMMARY OF THE INVENTION

The aim of the present invention is thus to propose a process for the hydrotreatment of renewable feeds which can permit improved management of the exothermicity, while limiting the quantity of liquid recycled.

Thus, the present invention concerns a process for the hydrotreatment of a feed obtained from renewable sources in order to produce paraffinic hydrocarbons carried out in the presence of hydrogen in a fixed bed reactor having a plurality of catalytic zones disposed in series and each comprising at least one hydrotreatment catalyst, in which:

a) the total stream of feed F is divided into a number of different part-streams of feed F1 to Fn equal to the number of catalytic zones n, where n is a whole number in the range 1 to 10, in the reactor, the first part-stream of feed F1 being injected into the first catalytic zone Z1, the second part-stream of feed F2 being injected into the second catalytic zone Z2 and so on if n is greater than 2, the hydrotreatment process being operated at a temperature in the range 180° C. to 400° C., at a pressure in the range 0.1 MPa to 15 MPa, at an hourly space velocity in the range $0.1\ h^{-1}$ to $10\ h^{-1}$, and with a ratio of the flow rate of hydrogen to the flow rate of feed in the range 150 to 1500 $Nm^3/m^3$, the mass flow rate of hydrogen sent to the first catalytic zone representing more than 80% by weight of the total mass flow rate of hydrogen used in the hydrotreatment process, in order to produce at least one effluent containing paraffinic hydrocarbons from the reactor outlet, b) said effluent obtained from step a) undergoes at least one separation step in order to separate at least one gaseous fraction and at least one liquid fraction containing paraffinic hydrocarbons, c) at least a portion of said liquid fraction containing paraffinic hydrocarbons is recycled to the first catalytic zone and to the following catalytic zones in a manner such that the local recycle ratio for each of the beds, i.e. the ratio by weight between the stream of said recycled liquid fraction and the part-stream of feed introduced into the catalytic zone Fn is 2 or less, preferably 1.7 and more preferably 1.5, the local dilution ratio over each of the beds, i.e. the ratio by weight between the quantity of liquid and gaseous diluting streams introduced into the catalytic zone n and the part-stream of feed introduced into the catalytic zone Fn is less than 4, preferably less than 3.8, more preferably less than 3.5, highly preferably less than 3, more preferably less than 2.5 and more preferably again less than 2.

One advantage of the present invention is that a process is provided which, despite using a low liquid recycle ratio, in particular less than 2, over each of the catalytic zones, provides for optimized management of the exothermicity within the various catalytic zones, in particular because of the combination of said low recycle ratio over each of the catalytic zones and a high hydrogen flow rate at the inlet to the first bed.

Another advantage of the present invention resides in the use of a low liquid recycle, which facilitates revamping of existing units. The term "revamping" means revising the design of equipment which is already operating and which is not necessarily a unit for the hydrotreatment of vegetable oils but may, for example, be a unit for the hydrotreatment of diesel type fossil feeds, in order to increase the production, the technical, economic and environmental performance as well as the reliability.

Another advantage of the present invention resides in the reduction in the quantity of liquid recycle necessary, which limits the pressure drop and means that reactors with smaller dimensions can be used, the injection of hydrogen concentrated at the head of the reactor meaning that good distribution over the catalytic bed can be preserved.

Another advantage of the invention, in the preferred case in which 100% of the recycled hydrogen-rich gas is injected into the head of the reactor, is not having to inject gas into the quench zones between the beds, meaning that the design of these zones as well as control around these zones is considerably simplified.

Another advantage of the present invention consists of favouring the hydrodeoxygenation pathway by eliminating oxygen and forming water, rather than eliminating oxygen via the decarboxylation reactions, by controlling the temperatures to those adapted for hydrodeoxygenation at the inlet to each catalytic zone. The advantages provided by this solution are an increase in the yield of paraffinic hydrocarbons and the reduction in the quantity of $CO/CO_2$ formed, which means that the inhibiting effect of CO on the activity of the hydrotreatment catalyst can be limited, and thus the quantity of catalyst used can be reduced. The fact of favouring the hydrodeoxygenation pathway also means that corrosion due to the presence of $CO_2$ in the reactor is reduced, and the quantity of amine required to separate the $CO_2$ is reduced.

DESCRIPTION OF THE INVENTION

The process in accordance with the present invention consists of converting into paraffinic hydrocarbons, and more precisely into middle distillates (kerosenes and/or gas oils), a wide range of feeds of renewable origin, essentially composed of triglycerides and fatty acids. These feeds are generally characterized by a high molar mass (usually more than 800 g/mole), and with the fatty acid chains of which they are composed generally containing in the range 4 to 30 carbon atoms, or even reaching higher values, and with the number of unsaturated bonds per chain generally being in the range 0 to 3, with higher values which may be obtained for certain specific feeds.

The feeds obtained from renewable sources in accordance with the invention are advantageously selected from vegetable oils, oils from algae or algal oils, fish oils, spent cooking oils, fats of vegetable or animal origin, or mixtures of such feeds, containing triglycerides and/or free fatty acids and/or esters.

A list of non-exhaustive examples of feeds which may be converted by the process in accordance with the present invention which may be cited is as follows: vegetable oils such as rapeseed, jatropha, soya, palm, sunflower, olive, copra, camelina, fish oils or heterotrophic or autotrophic algal oils, or even animal fats such as beef suet, or even residues from the papermaking industry (such as "tall oil"), or mixtures of these various feeds.

All of these feeds have high oxygen contents as well as, in highly variable quantities depending on the origin of the feeds, sulphur-containing compounds, but also nitrogen-containing compounds, and metals such as phosphorus, calcium, magnesium, potassium or sodium. The metals content may be up to 2500 ppm. The nitrogen and sulphur contents are generally in the range approximately 1 ppm to 100 ppm, preferably less than 100 ppm, depending on their nature. They may be as high as 1% by weight for particular feeds.

The feed which is treated may be crude, or may also have undergone a refining or pre-refining treatment aimed at reducing the metals content. This pre-treatment step may already have been carried out or be carried out in a pre-treatment section placed upstream of the hydrotreatment reactor. This optional pre-treatment step may consist of a heat treatment associated with passage over solids such as aluminas or silica-aluminas, or even a steam treatment, or a treatment with an acid such as phosphoric acid, for example, or even a treatment with an ion exchange resin, or even an association of several of these pre-treatment steps. In general, the pre-treatment may include any method (degumming, dephosphatation, etc) known to the person skilled in the art dealing with refining oil for food purposes.

Hydrotreatment

The process in accordance with the invention concerns a process for the hydrotreatment of a feed obtained from renewable sources in order to produce paraffinic hydrocarbons carried out in the presence of hydrogen in a fixed bed reactor having a plurality of catalytic zones disposed in series and each comprising at least one hydrotreatment catalyst.

In accordance with the invention, said feed is mixed with a hydrogen-rich gas which may also contain other inert hydrocarbon compounds, i.e. compounds which do not react as they are on the hydrotreatment catalysts, in contrast to the constituents of the feed. The hydrogen may advantageously be supplied by a makeup of hydrogen and/or from recycling a hydrogen-rich gas obtained from the separation step b) downstream of the hydrotreatment step and/or from recycling a hydrogen-rich gas obtained from a subsequent step in the hydrotreatment process in accordance with the invention, and preferably from a step for separation downstream of the subsequent hydroisomerization step. In practice, the makeup hydrogen may originate from steam reforming or from catalytic reforming, and its hydrogen purity is usually in the range 75% to 99.9% by volume, the other gases present generally being methane, ethane, propane and butane. The hydrogen-rich gas obtained from the separation step b) downstream of the hydrotreatment step or even obtained from the separation step downstream of the optional hydroisomerization step has preferably already undergone one or more intermediate purification treatments before being recycled to the hydrotreatment process and/or to the optional hydroisomerization step.

For easier comprehension of the present invention, the following definitions are introduced. They make reference to FIG. 2. The hydrotreatment reactor of the process in accordance with the invention may contain a variable number n of catalytic zones.

The term "catalytic zone" means a catalytic bed. Each catalytic zone may comprise one or more layers of catalysts, which may be identical or different, optionally supplemented by inert layers. The catalytic zones may contain identical or different catalysts.

In accordance with the invention, the reactor comprises a number n of catalytic zones, n being a whole number in the range 1 to 10, preferably in the range 1 to 6, more preferably in the range 2 to 5, highly preferably in the range 2 to 4, and more preferably again in the range 2 to 3.

In a highly preferred embodiment, the reactor comprises 2 catalytic zones.

All of the streams are expressed in terms of the mass flow rate.

F: total stream of renewable feed treated in the process
F1: part-stream of feed introduced into the first catalytic zone Z1
F2: part-stream of feed introduced into the second catalytic zone Z2
F3: part-stream of feed introduced into the third catalytic zone Z3
and so on . . . .
Fn: part-stream of feed introduced into the last catalytic zone Zn
RL1: liquid recycle stream recycled to the first catalytic zone Z1
RL2: liquid recycle stream recycled to the second catalytic zone Z2
and so on . . . .
RLn: liquid recycle stream recycled to the last catalytic zone Zn
RG1: gaseous stream recycled to the first catalytic zone Z1, the gaseous stream comprising mainly hydrogen.
RG2: gaseous stream recycled to the second catalytic zone Z2, the gaseous stream comprising mainly hydrogen.
and so on . . . .
RGn: gaseous stream recycled to the last catalytic zone Zn, the gaseous stream comprising mainly hydrogen.

When a gas makeup containing hydrogen is supplied to any catalytic zone, the mass flow rate of this makeup is added to the mass flow rate of the gaseous stream recycled from said zone and thus accounted for in RG1, . . . . RGn.

Throughout the remainder of the text, the term "local recycle ratio over each of the catalytic zones (TRn)" means the weight ratio between the sum of the liquid recycle streams supplying the catalytic zones Z1 to Zn−1 and of the liquid recycle stream introduced into the catalytic zone Zn over the part-stream of the feed introduced into the catalytic zone Zn (Fn).

In fact, the total quantity of liquid recycle passing through the catalytic zone Zn comprises the liquid recycle introduced into the catalytic zones Z1 to Zn−1 (RL1+RL2+ . . . RLn−1) and which supply and pass through the catalytic zones Z1 to Zn−1 then the catalytic zone Zn, as well as the liquid recycle introduced into the catalytic zone Zn (RLn).

Thus, the local recycle ratio over each of the beds is expressed by the following formula:

$$TRn=(RL1+RL2+ \ldots +RLn-1+RLn)/Fn$$

Regarding the catalytic zone 1, the local recycle ratio over the catalytic zone 1 is the weight ratio between the liquid recycle stream sent to the first catalytic zone Z1 (RL1) and the part-stream of the feed introduced into the first catalytic zone 1 (F1): TR1=RL1/F1.

Throughout the remainder of the text, the term "degree of dilution of the feed over each of the catalytic zones (TDn)" means the weight ratio between the quantity of diluting liquid and gaseous streams arriving in the catalytic zone n and the part-stream of feed introduced into the catalytic zone Fn.

To calculate the degree of dilution, the dilution of the feed both by the liquid and gaseous streams is taken into account.

The quantity of liquid and gaseous streams passing through the catalytic zone n comprises the liquid recycle introduced into the catalytic zone n−1 (RLn−1) which passes through the bed n, the gas recycle constituted by hydrogen-containing gas which has not reacted in the catalytic zone n−1 (RGn−1), the liquid and gas recycle introduced into the catalytic zone n (RLn+RGn) as well as the hydrotreated product obtained from the catalytic zone n−1. It is assumed that the conversion of the feed in each catalytic bed is 100%, and so the quantity of hydrotreated product obtained from the catalytic zone n−1 is thus equal to the quantity of feed introduced into the catalytic zone n−1 (Fn−1).

Thus, the degree of dilution over each of the catalytic zones is defined in accordance with the invention by the following formula:

$$TDn=((F1+ \ldots +Fn-1)+(RL1+ \ldots +RLn-1+RLn)+ \\ (RG1+ \ldots +RGn-1+RGn))/Fn$$

In particular, regarding the catalytic zone 1, the degree of dilution of the feed over the catalytic zone 1 is the weight ratio between the diluting liquid and gas recycle stream sent to the first catalytic zone Z1 (RL1+RG1) and the part-stream of the feed introduced into the first catalytic zone 1 (F1): TD1=(RL1+RG1)/F1.

In accordance with step a) of the process of the invention, the total stream of feed F is divided into a number of different part-streams F1 to Fn equal to the number of catalytic zones n in the reactor, the first part feed stream F1 being injected into the first catalytic zone, the second part-stream of feed F2 being injected into the second catalytic zone and so on, if n is more than 2, said hydrotreatment process being operated at a temperature in the range 180° C. to 400° C., at a pressure in the range 0.1 MPa to 15 MPa, at an hourly space velocity in the range $0.1 \, h^{-1}$ to $10 \, h^{-1}$ and with a ratio between the flow rate of hydrogen and the flow rate of feed being in the range 150 to 1500 $Nm^3/m^3$, the mass flow rate of hydrogen sent to the first catalytic zone representing more than 80% by weight of the total mass flow rate of hydrogen used in the hydrotreatment process, in order to produce at least one effluent containing paraffinic hydrocarbons at the reactor outlet.

With the exception of during the start-up phase of the process, at least a portion of said liquid fraction containing paraffinic hydrocarbons obtained from separation step b) is recycled to the first catalytic zone Z1 and to the following catalytic zones Zn. Said liquid fraction containing paraffinic hydrocarbons thus acts as a liquid diluting agent for the feed.

The hydrotreatment section of the process is designed to completely convert the treated feeds, and so the liquid recycle produced is a stream of paraffinic hydrocarbons with an oxygen content which is very low and preferably below the analytical detection limit, and is essentially composed of paraffins. As a consequence, this liquid recycle is inert as regards hydrotreatment reactions which take place in the various catalytic zones, and thus acts solely as a diluting liquid for the feed, which means that the rise in temperature in the first catalytic zone as well as in the following catalytic zones due to the exothermicity of the reactions occurring there is limited.

During the start-up phase, a wide range of hydrocarbons may be injected as a liquid diluting agent such as, for example, a light gas oil cut up to whatever hydrotreated product is available for recycling to the first catalytic zone Z1 and to the subsequent catalytic zones Zn.

In accordance with the invention, said hydrotreatment process is operated at a temperature in the range 180° C. to 400° C., preferably at a temperature in the range 200° C. to 350° C., at a pressure in the range 0.1 MPa to 15 MPa, preferably in the range 0.5 to 10 MPa, and more preferably in the range 1 MPa to 10 MPa, at an hourly space velocity in the range 0.1 $h^{-1}$ to 10 $h^{-1}$, and with a ratio between the total flow rate of hydrogen and the total flow rate of feed in the range 150 to 1500 $Nm^3/m^3$.

As indicated above, the hydrogen is used in excess. In the process in accordance with the invention, the total quantity of hydrogen used in said process is such that the ratio between the total flow rate of hydrogen and the total flow rate of feed is in the range 150 to 1500 $Nm^3/m^3$, preferably in the range 400 to 1200 $Nm^3/m^3$, preferably in the range 600 to 900 $Nm^3/m^3$.

Preferably, the hourly space velocity, defined as the ratio between the total volume flow rate of treated feed and the total volume of catalyst in the hydrotreatment section, is in the range 0.1 to 5 $h^{-1}$, preferably in the range 0.1 to 3 $h^{-1}$.

The hydrotreatment process in accordance with the invention may advantageously be operated in counter-current or upflow co-current mode or in downflow co-current mode, preferably in downflow co-current mode.

An essential criterion of the invention resides in the fact that the mass flow of hydrogen sent to the first catalytic zone, representing more than 80% by weight of the total mass flow of hydrogen used in the hydrotreatment process, preferably more than 90% and more preferably all of the mass flow of hydrogen used in the hydrotreatment process, is sent to the first catalytic zone Z1.

Using a high flow rate of gas at the inlet to the first catalytic zone Z1 means that a low flow rate of liquid recycle can be used in all of the catalytic zones, and in particular in the first zone (the following zones benefiting from the dilution obtained from the feed treated in the upper beds). In fact, the use of a high flow rate of gas at the inlet to the first catalytic zone Z1 means that a volume of reactive gas is heated up by absorbing part of the exothermicity of the reaction. A very high liquid recycle flow rate is no longer in order necessary to manage the exothermicity. This means that hydrotreatment reactors with dimensions comparable to those of hydrotreatment reactors for oil cuts such as gas oils can be used (and thus the costs can be limited), and the pressure drops can be limited and reactor congestion phenomena can be avoided.

The use of a large quantity of hydrogen in the first catalytic zone also means that the transfer of hydrogen from the gas phase to the liquid phase, and thus to the catalyst, is facilitated. In fact, in the process of the invention and in particular in the first catalytic zone, the overall efficiency of the hydrodeoxygenation reaction is potentially limited by the intensity of this transfer. In fact, the catalyst is not always used in an optimal manner in the first phases of the hydrodeoxygenation reaction because of the difficulty of supplying the catalyst with hydrogen. The transfer of gas towards the liquid remains high, but not always sufficient to correspond to the demand for hydrogen in order to convert the feed. The increase in the flow rate of hydrogen in the first catalytic zone moves in the direction of increasing the gas-liquid transfer, and thus of a better supply of hydrogen to the catalyst. This is thus used in an optimal manner, since the overall efficiency of the reactor is less limited by the intensity of the gas-liquid transfer. At iso-conversion of the feed, the quantity of catalyst to be placed in the reactor, and in particular in the first catalytic zone, is thus optimized.

In the case in which more than 80% by weight of the total mass flow rate of hydrogen used in the hydrotreatment process is sent to the first catalytic zone, one or more streams of hydrogen may advantageously be injected between the catalytic zones after the first zone.

Furthermore, it has been discovered that it is advantageous to inject the feed into the various catalytic zones (mass flow rate F1 injected into the zone Z1, F2 into the zone Z2, etc) in a manner such that increasing proportions of feed are injected into successive catalytic zones. This can be expressed by the following relationship:

F(n−1)/F less than or equal to Fn/F, for the general case in which n is the number of catalytic zones employed.

Thus, preferably, the various part-streams of feed are injected into the successive catalytic zones in increasing proportions in a manner such that F1/F is less than or equal to F2/F, which is itself less than or equal to F3/F, and so on up to F(n−1)/F being less than or equal to Fn/F.

The advantage provided by such a feed distribution in the various successive catalytic zones resides in the fact that the outlet temperatures for the various zones follow an increasing profile, which means that the temperature difference between the outlet temperature and the inlet temperature for each catalytic zone is comparable for each catalytic zone.

The part-streams of feed injected into the inlet to the catalytic zones located downstream of the first catalytic zone Z1 may advantageously be strictly identical to the stream of feed injected into the inlet to zone Z1, but may also be a feed of renewable origin but of a different nature.

Thus, the total feed is distributed in various streams F1, F2, . . . , Fn supplying the various successive catalytic zones. A makeup of hydrogen-rich gas may optionally be injected upstream of the first catalytic zone Z1 and also between the catalytic zones Zn and Zn+1 following the first. The stream of feed F1, optionally supplemented with a makeup of hydrogen containing gas, is mixed with liquid and gas recycle streams (RL1 and RG1), preferably before said stream of feed F1 is sent to the first catalytic zone Z1, or directly to the first catalytic zone Z1. Similarly, the stream of feed (F2), optionally supplemented with a makeup of hydrogen-containing gas, is mixed with a liquid recycle stream RL2 and optional gas stream RG2 in the case in which 100% of the mass flow rate of hydrogen used in the hydrotreatment process is not sent to the first catalytic zone Z1 and so on up to the $n^{th}$ catalytic zone.

In the same manner, the part-streams of feed injected into the catalytic zones downstream of the first zone, F2 to Fn, optionally supplemented with a makeup of hydrogen-containing gas, and mixed with the corresponding liquid recycle streams RL2 to RLn and optionally with gas recycle streams RG2 to RGn, are mixed with the compounds obtained from the preceding catalytic zones, preferably in the mixing zones between said catalytic zones. Said part-stream of feeds may also optionally be sent directly to the mixing zones between the catalytic zones before mixing them.

Thus, the streams entering the second catalytic zone are:
 the feed injected into the inlet to zone Z2 (F2), such that the weight ratio F2/F is greater than or equal to the weight ratio F1/F,
 the liquid recycle injected into the inlet to zone Z2 (RL2), almost exclusively composed of paraffinic hydrocarbons,
 the gas recycle injected into the inlet to zone Z2 (RG2), mainly composed of hydrogen, including an optional makeup of hydrogen containing gas also accounted for in RG2,
 the liquid and gaseous streams obtained from the catalytic zone obtained from the catalytic zone 1: (RL1+RG1+F1 as mass flow rate), where:

RL1 is the liquid recycle injected into the inlet to zone Z1, almost exclusively composed of paraffinic hydrocarbons and having passed through zone Z1, RG1 is the gas recycle injected into the inlet to zone Z1, mainly composed of hydrogen which has not reacted in zone Z1, F1 corresponds to the hydrotreated effluent formed by conversion of the feed in zone Z1, assuming that the operating conditions applied can be used to obtain 100% conversion of the feed in each catalytic zone. The liquid hydrocarbons present in this effluent are free of oxygen and are almost exclusively paraffinic hydrocarbons.

Before introduction into the hydrotreatment process, the temperature of the part-streams of feed F1, F2, . . . Fn is advantageously less than 150° C. It must be sufficient to allow a sufficient reduction in viscosity and thus an adequate transfer from the storage tanks to the hydrotreatment reaction section. It is neither useful nor desirable to raise the temperature of the feed to higher values in the absence of hydrogen, in order to avoid any degradation of the feeds as a result of polymerization and as a result of coking, for example, and to control the temperature at the inlet to the catalytic zones following the first zone.

In the same manner, the temperature of the injected recycle gas RG1 to RGn, optionally mixed with makeup hydrogen at the inlet to the catalytic zones Z1 to Zn composed mainly of hydrogen, which is mixed with the part-stream of feeds, is as low as possible to be compatible with operating the process, since it is advantageous for the process to mix the feed with hydrogen at low temperature, so as to reduce the temperature, by a quench effect, applied to the hydrocarbon products leaving the various catalytic zones.

The temperature of the total stream (liquid+gaseous) injected into the inlet to the catalytic zone Z1 (feed+liquid recycle+gas recycle+any makeup $H_2$) must be adjusted carefully.

However, since the hydrodeoxygenation and/or decarboxylation reactions taking place in the catalytic zones are exothermic, the temperature increases as the feed is transformed in the various catalytic zones.

Preferably, the temperature at the inlet to the first catalytic zone Z1 is more than 180° C., preferably more than 200° C., and the temperature at the outlet from said first zone is preferably less than 350° C., more preferably less than 320° C., and still more preferably less than 300° C.

The temperature at the inlet to each of the catalytic zones following the first must also be controlled in a manner such that the mixing temperature at the outlet from a preceding catalytic zone is not too high, so as to avoid secondary reactions such as polymerization, cracking and deactivation of the catalyst.

The temperatures at the inlet to the catalytic zones following the first zone may advantageously be higher than that at the inlet to the preceding zone, generally below 300° C. and preferably below 280° C.

The temperature at the outlet from at least one catalytic zone following the first zone is preferably more than 260° C., preferably more than 280° C. The temperatures at the outlet from each of the catalytic zones following the first zone are preferably below 400° C., and more preferably below 380° C., and still more preferably below 350° C.

In general, a difference in temperature between the outlet temperature and the inlet temperature for each catalytic zone which is in the range 1° C. to 80° C., preferably in the range 20° C. to 78° C., more preferably in the range 25° C. to 75° C., is maintained.

The part-stream of feeds F2 to Fn, supplemented with liquid recycles RL2 to RLn and gas recycles RG2 to RGn injected into the catalytic zones located downstream of the first catalytic zone Z1 in which they are mixed with the hydrotreated effluent from the zone n−1, can be used to reduce the temperature of the hydrotreated product formed and thus to control the temperature at the inlet to the next catalytic zone. The same families of reactions occur in the zone Zn and the zone Zn−1, with slightly faster kinetics than in the zone Zn−1 because the mean temperature is higher.

In a preferred variation, valves for regulating the part-stream of feeds, the liquid recycle and the hydrogen-containing gas may be controlled by the values for the temperature at the inlet to the first catalytic zone and the difference in temperature at the outlet and the inlet to each catalytic zone so as to adjust the part-streams of feed and hydrogen as well as the stream of liquid recycle during operation. Similarly, the temperature may be controlled by varying the temperature of the feed and/or injected hydrogen and/or the liquid and gas recycle. In this manner, the desired temperature at the inlet to the catalytic zones and/or the temperature difference in the catalytic zones is maintained and preferably, the rising temperature profile in the catalytic zones is adjusted.

In accordance with the invention, at least a portion of said liquid fraction containing paraffinic hydrocarbons is recycled to the first catalytic zone and to the following catalytic zones in a manner such that:

the local recycle ratio over each of the beds, i.e. the weight ratio between the stream of said liquid recycle fraction and the part-stream of feed introduced into the catalytic zone Fn is less than or equal to 2, preferably less than or equal to 1.7, more preferably less than or equal to 1.5.

Using a high liquid recycle ratio is known to permit better management of the exothermicity, and in particular to maintain the temperature difference between the outlet and inlet temperature for each catalytic zone within an acceptable range for industrial operation of the process. Surprisingly, despite using a low recycle ratio, the present invention can be used to optimize the management of the exothermicity in the various catalytic zones thanks to a combination of said low recycle ratio and a high flow rate of hydrogen at the inlet to the first bed.

Furthermore, using a low liquid recycle facilitates revamping of existing units. The term "revamping" is used to denote revising the design of equipment which is already in use to increase the production, the technical, economic and environmental performances as well as the reliability.

Preferably, the local degree of dilution over each of the beds, i.e. the weight ratio between the quantity of liquid and gaseous streams introduced into the catalytic zone n and the part-stream of feed introduced into the catalytic zone Fn is less than 4, preferably less than 3.8, more preferably less than 3.5, and highly preferably less than 3, even more preferably less than 2.5 and still more preferably less than 2.

In accordance with the invention, each catalytic zone comprises at least one hydrotreatment catalyst.

The types of hydrotreatment catalysts used in the process in accordance with the invention are well known to the person skilled in the art and may be a combination of the catalysts described below. A single catalyst or several identical or different catalysts may advantageously be used in the catalytic zones. Inert solid may also be added to the head and/or the bottom of the catalytic bed to ensure good hydrodynamics in the catalytic bed.

The hydrotreatment catalyst is advantageously a hydrotreatment catalyst comprising a hydrodehydrogenating function comprising at least one metal from group VIII, preferably selected from nickel and cobalt, used alone or as a mixture, preferably in association with at least one metal from group VIB, preferably selected from molybdenum and tungsten, used alone or as a mixture, and a support selected from the group formed by alumina, silica, silica-aluminas, magnesia, clays and mixtures of at least two of these minerals. This support may also advantageously comprise other compounds, for example oxides selected from the group formed by boron oxide, zirconia, titanium oxide and phosphoric anhydride. The preferred support is an alumina support.

Preferably, a NiMo type catalyst is used on an alumina support.

The content of oxides of metals from group VIII, preferably nickel oxide, is advantageously in the range 0.5% to 10% by weight of nickel oxide (NiO) and preferably in the range 1% to 5% by weight of nickel oxide, and the quantity of oxides of metals from group VIB, preferably molybdenum trioxide, is advantageously in the range 1% to 30% by weight of molybdenum oxide ($MoO_3$), preferably 5% to 25% by weight, the percentages being expressed as a % by weight with respect to the total mass of catalyst.

Said catalyst may advantageously contain a doping element selected from phosphorus and boron, used alone or as a mixture, with a quantity by weight of the oxide of said doping element advantageously being less than 20% and preferably less than 10% and advantageously at least 0.001% with respect to the total mass of catalyst.

Concerning active catalysts in the form of sulphides, and with the feeds that are treated generally having limited sulphur contents (less than 100 ppm by weight in general, and usually less than 50 ppm by weight), it is generally appropriate to add a sulphur-containing compound which is known to the person skilled in the art to the streams of feed. This device can be used to keep the hydrotreatment catalysts used in the present process in their sulphide form, and thus to maintain a sufficient catalytic activity throughout the cycle.

The volume of catalyst and the formulation of the catalyst or catalysts used in the catalytic zones of the process in accordance with the invention are adapted in a manner such that the conversion of the feed, i.e. the oxygen elimination ratio, is almost complete, and preferably complete at the outlet from the first zone Z1 and preferably in the following catalytic zones.

The context of the present invention encompasses using a single catalyst or several different catalysts in the catalytic zones in the hydrotreatment step of the process in accordance with the invention, simultaneously or successively.

The process in accordance with the invention uses fixed bed trickle flow reactors which are known to the person skilled in the art. The reagents (feed and hydrogen) are introduced into the reactor in a downward co-current flow from the top to the bottom of the reactor. Examples of reactors of this type are described in the document U.S. Pat. No. 7,070,745.

It is possible to inject supplemental makeup hydrogen and/or to recycle a hydrogen-rich gas obtained from the separation step b) between each catalytic zone, in order to profit from a quench effect and to obtain the desired temperatures at the inlet to the next catalytic zone. Thus, quench boxes may advantageously be installed between each catalytic zone, in order to provide better homogeneity in the temperature differences over the entire section of the reactor and over all of the catalytic zones.

In the same manner, distributors could be installed, preferably below the quench devices between each catalytic zone, in order to guarantee a homogeneous supply of liquid and gas feed over the entire section of the reactor and for all of the catalytic zones.

However, in accordance with a preferred variation in which 100% of the hydrogen-rich gas recycle is injected into the head of the reactor, only liquid is injected into the zones between the catalytic zones, considerably simplifying the design of these zones.

One advantage of the process in accordance with the invention lies in its great flexibility, depending on the origin of the feed. Feeds which differ considerably among themselves, in particular in their varying degrees of unsaturation of the hydrocarbon chains, can be completely converted both as regards the elimination of oxygen (which brings about a maximum efficiency of dilution of the feed in the next zone) and as regards the elimination of nitrogen (which provides for a better operation of any downstream hydroisomerization step).

Optionally, the feeds obtained from renewable sources may also be treated in the process in accordance with the invention as a mixture with oil cuts such as gas oils, kerosenes, or even gasolines obtained from oil refining processes. Preferably, the oil cuts are middle distillate type oil feeds selected from the group formed by straight run atmospheric gas oils and/or kerosenes obtained from conversion processes, or any mixture thereof.

Preferably, the oil cuts are selected from the group formed by straight run atmospheric gas oils, gas oils obtained from conversion processes such as, for example, those from a coker, from fixed bed hydroconversion (such as those obtained from HYVAHL® processes for the treatment of heavy cuts developed by the Applicant), from a catalytic cracking unit (LCO cut from FCC) or processes for the hydrotreatment of heavy cuts in an ebullated bed (such as those obtained from H-OIL® processes), or even solvent deasphalted oils (for example using propane, butane or pentane) obtained from deasphalting straight run vacuum residues, or residues obtained from processes for the conversion of heavy feeds such as HYVAHL® and H-OIL®, for example. The feeds may also advantageously be formed by mixing these various fractions. They may also advantageously contain light gas oils or kerosenes with a distillation profile of approximately 100° C. to approximately 370° C. They may also advantageously contain aromatic extracts and paraffins obtained in the context of the fabrication of lubricating oils.

In the present case, the quantity of liquid recycle sent to the first catalytic zone of the hydrotreatment section may be substantially reduced or even dispensed with since, during their treatment with hydrogen, these oil feed streams release less heat than during the treatment of feeds of renewable origin comprising substantial quantities of oxygen.

Separation

In accordance with the invention, the effluent containing paraffinic hydrocarbons obtained from step a) undergoes at least one separation step b) in order to separate at least one gaseous fraction and at least one liquid fraction containing paraffinic hydrocarbons.

Said separation step can also advantageously be used to separate at least one liquid fraction containing water.

Said gaseous fraction separated at the end of step b) and comprising hydrogen is recycled to step a). Said gaseous fraction also advantageously contains CO, $CO_2$, $H_2S$, light gases and possibly water.

In accordance with a variation, the separation may be carried out in at least two steps, preferably in a high temperature high pressure (HTHP) separator in order to separate a gaseous fraction comprising hydrogen, CO, $CO_2$, $H_2S$, light gases and a large proportion of the water formed during the hydrodeoxygenation reactions, and a liquid fraction containing paraffinic hydrocarbons, the gaseous fraction then being sent to a low temperature high pressure separator in order to separate a gaseous fraction comprising hydrogen, CO, $CO_2$, $H_2S$, light gases and a large proportion of the water formed during the hydrodeoxygenation reactions, and a liquid fraction containing paraffinic hydrocarbons.

The high temperature high pressure (HTHP) separator is preferably operated without a substantial reduction in pressure compared with the pressure in the hydrotreatment reactor, i.e. at a pressure such that the pressure of the separation is less than 1 MPa below the pressure in the hydrotreatment step, and at a temperature in the range 145° C. to 360° C., preferably in the range 150° C. to 300° C. Said high temperature high pressure (HTHP) separation can be used to separate a gaseous fraction comprising hydrogen, CO, $CO_2$, $H_2S$, light gases and a large proportion of the water formed during the hydrodeoxygenation reactions and a liquid fraction containing paraffinic hydrocarbons.

In the case in which separation step b) is carried out in at least two steps, a water separation step is advantageously carried out downstream of said step b), so as to separate a gaseous fraction comprising hydrogen, CO, $CO_2$, $H_2S$, light gases, a liquid fraction comprising water and a liquid fraction containing paraffinic hydrocarbons. Said water separation step is advantageously carried out in accordance with methods which are known to the person skilled in the art, preferably in a low temperature high pressure separator. Separating the water in a low temperature high pressure separator may optionally be followed by a separation step in a low temperature low pressure separator.

Said gaseous fraction comprising hydrogen may then advantageously be recycled to step a).

In another variation, separation step b) is carried out in two steps, the first separation being carried out in a low temperature high pressure (LTHP) separator, preferably without substantial reduction in pressure compared with the pressure in the hydrotreatment reactor, i.e. at a pressure such that the separation pressure is less than 1 MPa below the pressure in the hydrotreatment step, said first step being operated at a temperature in the range 25° C. to 200° C., preferably in the range 50° C. to 150° C., and at a pressure in the range 0.1 to 15 MPa, preferably in the range 2 to 10 MPa, the second separation being carried out in a low temperature low pressure (LTLP) separator at a temperature in the range 25° C. to 200° C., preferably in the range 50° C. to 150° C., and at a pressure in the range 0.1 to 8 MPa, preferably in the range 0.5 to 5 MPa. The first separation step (LTHP) can be used to separate a gaseous fraction comprising hydrogen, CO, $CO_2$, $H_2S$ and light gases freed from water, a liquid fraction comprising water and a liquid fraction containing the paraffinic hydrocarbons.

Said gaseous fraction comprising hydrogen may then advantageously be recycled to step a).

The aim of this step is to separate water from the liquid hydrocarbon effluent. The term "elimination of water" means elimination of the water produced by the hydrodeoxygenation (HDO) reactions and/or injected into the reaction section. The degree of elimination of the water is advantageously a function of the tolerance to water of the hydroisomerization catalyst used in the optional step following the process of the invention. The water may be eliminated using any of the methods and techniques known to the person skilled in the art such as, for example, drying, passage over a desiccant, flashing, solvent extraction, distillation and decantation, or by combining at least two of these methods.

The hydrogen containing gas which was separated during the separation step b) in accordance with the invention and/or from the optional hydroisomerization step is, if necessary, advantageously separated at least in part in order to reduce its light compounds content (C1 to C4). Similarly, it advantageously undergoes one or more intermediate purification treatments, preferably at least one scrub with at least one amine in order to evacuate the $CO_2$, preferably followed by methanation and/or separation by Pressure Swing Adsorption (PSA), before being recycled.

Recycled hydrogen, preferably purified, may advantageously be introduced, either with the feed entering the process in accordance with the invention and/or into the optional hydrotreatment step, or in the form of quench hydrogen between the beds of hydrodeoxygenation catalysts in accordance with the invention and/or the hydroisomerization catalysts.

Optionally, a final step for purification from the various pollutants may be carried out using methods which are known to the person skilled in the art such as, for example, by steam or nitrogen stripping or by coalescence and/or using a capture mass, or vacuum drying.

In accordance with the invention, at least a portion of said liquid fraction containing paraffinic hydrocarbons is recycled to the first catalytic zone and to the following catalytic zones with the recycle ratios and dilution ratios as described above, as a mixture with the corresponding part-stream of feeds.

The portion of liquid effluent which has not been recycled to supplement the part-stream of feeds injected at F1 to Fn as a liquid recycle may advantageously be sent either directly to the fuel pool for incorporation into the gas oil pool, or directly to an optional hydroisomerization step (HIS), in order to produce kerosenes and/or gas oils with improved cold properties.

Hydroisomerization

In accordance with a preferred embodiment, at least a portion of the liquid fraction containing paraffinic hydrocarbons obtained at the end of separation step b) is hydroisomerized in the presence of a hydroisomerization catalyst.

Thus, the optional hydroisomerization step of the process of the invention is advantageously operated at a temperature in the range 150° C. to 500° C., preferably in the range 150° C. to 450° C., and highly preferably in the range 200° C. to 450° C., more preferably in the range 250° C. to 400° C., at a pressure in the range 1 MPa to 10 MPa, preferably in the range 2 MPa to 9 MPa and highly preferably in the range 3 MPa to 7 MPa, at an hourly space velocity which is advantageously in the range $0.1\ h^{-1}$ to $10\ h^{-1}$, preferably in the range 0.2 to $7\ h^{-1}$ and highly preferably in the range 0.5 to $5\ h^{-1}$, at a flow rate of hydrogen such that the volume hydrogen/hydrocarbons ratio is advantageously in the range 70 to 1000 $Nm^3/m^3$, preferably in the range 100 to 1000 $Nm^3$ of hydrogen per $m^3$ of feed, and highly preferably in the range 150 to 1000 $Nm^3$ of hydrogen per $m^3$ of feed.

Said hydroisomerization step may be operated in countercurrent or in co-current mode, preferably in co-current mode.

The hydroisomerization catalysts used are advantageously bifunctional in type, i.e. they have a hydrodehydrogenating function and a hydroisomerizing function and advantageously comprise at least one metal from group VIII selected from platinum and palladium which are active in their reduced form and nickel and cobalt, preferably used in their sulphide form, and/or at least one metal from group VIB selected from molybdenum or tungsten as the hydrodehydrogenating function and at least one molecular sieve or an amorphous mineral support as the hydroisomerizing function.

In the case in which the hydroisomerization catalyst comprises at least one noble metal from group VIII, the total noble metal content of the hydroisomerization catalyst is advantageously in the range 0.01% to 5% by weight with respect to the finished catalyst, preferably in the range 0.02% to 4% by weight and highly preferably in the range 0.005% to 2% by weight.

In the case in which the hydroisomerization catalyst comprises at least one metal from group VIB in combination with at least one non-noble metal from group VIII, the quantity of metal from group VIB in the hydroisomerization catalyst is advantageously in the range, as the oxide equivalent, 5% to 40% by weight with respect to the finished catalyst, preferably in the range 10% to 35% by weight and highly preferably in the range 15% to 30% by weight, and the quantity of metal from group VIII of said catalyst is advantageously in the range, as the oxide equivalent, 0.5% to 10% by weight with respect to the finished catalyst, preferably in the range 1% to 8% by weight and highly preferably in the range 1.5% to 6% by weight. Preferably, the hydroisomerization catalyst comprises NiW.

In accordance with a preferred embodiment, said hydroisomerization catalyst comprises at least one amorphous mineral support as the hydroisomerizating function, said amorphous mineral support being selected from aluminas doped with fluorine and/or chlorine, silica-aluminas and siliceous aluminas, preferably silica-aluminas. Highly preferably, the catalyst comprises NiW on silica-alumina.

In accordance with a further preferred embodiment, said hydroisomerization catalyst comprises at least one molecular sieve, preferably at least one zeolitic molecular sieve, and more preferably at least one zeolitic monodimensional 10 MR molecular sieve as the hydroisomerizating function.

Zeolitic molecular sieves are defined in the "Atlas of Zeolite Structure Types", W. M Meier, D. H. Olson and Ch. Baerlocher, 5th revised edition, 2001, Elsevier, to which reference is also made in the present application, and are selected from zeolitic molecular sieves with structure type TON, such as NU-10, FER, such as ferrierite, EUO, selected from EU-1 and ZSM-50, used alone or as a mixture, or the zeolitic molecular sieves ZSM-48, ZBM-30, IZM-1, COK-7, EU-2 and EU-11, used alone or as a mixture.

Preferably, said hydroisomerization catalyst also comprises a binder constituted by a porous mineral matrix. Said binder may advantageously be used during the step for shaping said hydroisomerization catalyst.

Fractionation

Part or all of the hydroisomerized effluent, preferably all, then advantageously undergoes one or more separations.

The step or steps for separation of the effluent obtained from the hydroisomerization step is(are) advantageously carried out in the same manner as in step b) for separation of the hydrotreated effluent, with the same embodiments. The separation step or steps can be used to separate at least one gaseous fraction, at least one liquid fraction comprising water and at least one fraction comprising hydrocarbons.

The fraction comprising hydrocarbons may then advantageously undergo a step for fractionation which advantageously comprises a flash separation for separating the gas from the liquid and/or a stripping column or an atmospheric distillation. Preferably, the fractionation step comprises an atmospheric distillation. The aim of this step is to separate the gases from the liquid, and in particular to recover the hydrogen-rich gases which may also contain light compounds such as the C1-C4 cut, a gasoline cut (150° C.−), and at least one middle distillates cut (150° C.+) containing kerosene and/or gas oil.

Upgrading of the gasoline (or naphtha) cut does not form the subject matter of the invention, but this cut may advantageously be sent to a steam cracking unit for the production of olefins and associated hydrogen, or for steam reforming for the production of hydrogen, or for catalytic reforming for the production of gasoline. The hydrogen produced thereby may be injected into the hydrotreatment step a) and/or the optional hydroisomerization step.

The middle distillate cuts which represent the desired fuel bases may comprise a cut containing gas oil and kerosene, or the two cuts may be recovered separately. These products are based on renewable sources and do not contain sulphur-containing compounds.

At least a portion of the middle distillate cut or cuts may be recycled to the hydrotreatment step as a recycle.

In accordance with a variation, at least a portion of the 150° C.+ fraction may be recycled to the hydroisomerization step. Thus, this fraction again undergoes isomerization, which improves the cold properties.

In accordance with another variation, at least a portion of the 300° C.+ fraction may be recycled to the hydroisomerization step. Thus, this fraction again undergoes isomerization, which means that this cut can be upgraded into lighter products and the cold properties can be improved.

In another variation, at least a portion of the 150° C.+ fraction may be recycled to the hydrotreatment step.

Figure 1:
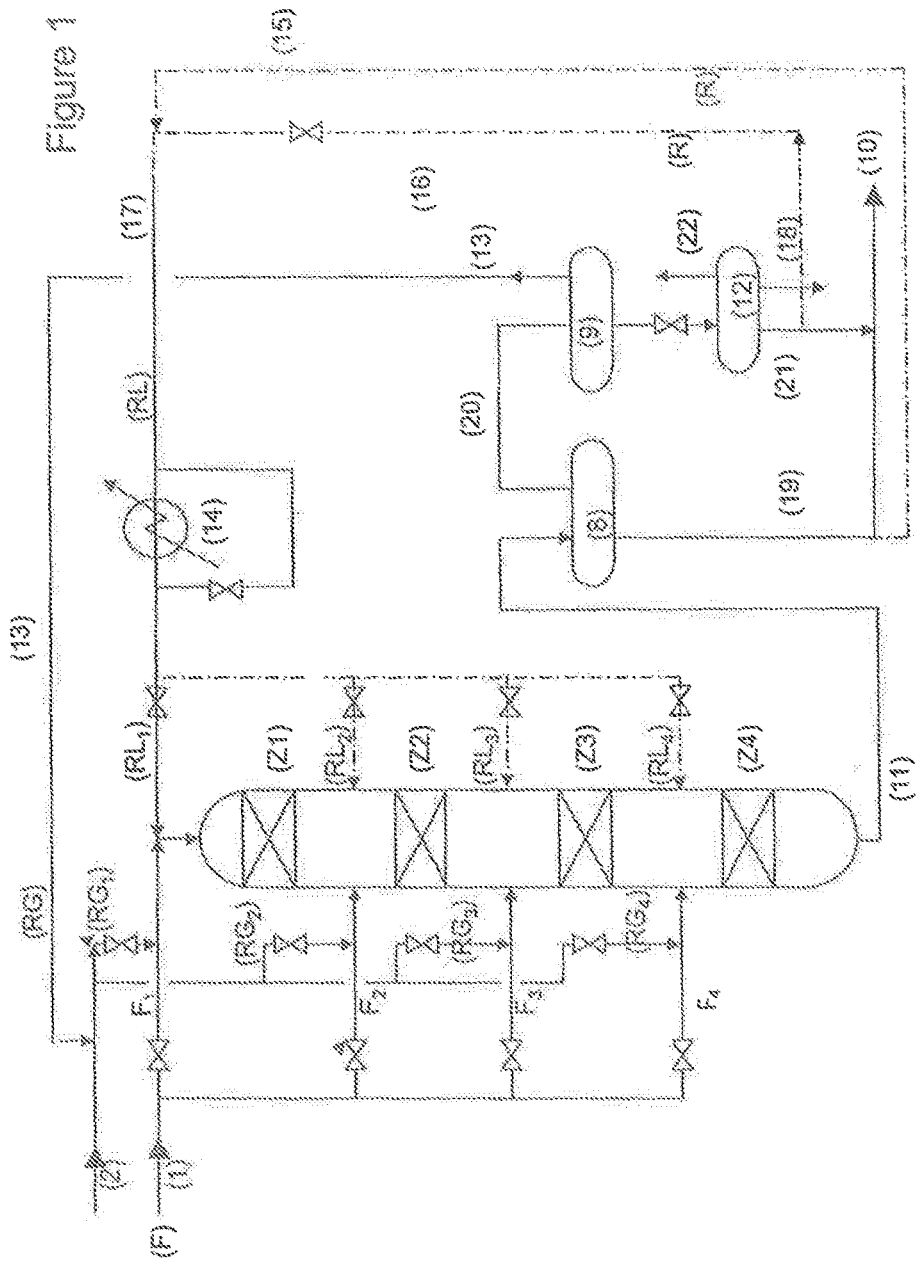
FIG. 1 represents a general layout of a process in accordance with the invention comprising n catalytic zones. In this particular embodiment n is 4 and thus there are 4 catalytic zones, Z1 to Z4.

The crude feed, also known as the fresh feed F, is injected into the line 1 represented in FIG. 1. The feed is distributed into various streams $F_1$, $F_2$, $F_3$, and $F_4$ supplying the various successive catalytic zones Z1, Z2, Z3, and Z4, respectively. The gas recycle RG is mixed with a hydrogen-rich gas 2. The stream RG (conduit 13) is subdivided into various streams $RG_1$, $RG_2$, $RG_3$ and $RG_4$. The liquid recycle stream 17 is subdivided into several streams $RL_1$, $RL_2$, $RL_3$, and $RL_4$. The feed stream $F_1$ is mixed with a liquid and gas recycle stream $RL_1$ and $RG_1$ via the conduits 15, 16 and 17 before said stream of feed $F_1$ is sent to the first catalytic zone Z1. Similarly, the stream of feed $F_2$, liquid recycle stream $RL_2$ and optional gas recycle stream $RG_2$ in the case in which 100% of the mass flow of hydrogen used in the hydrotreatment process is not sent to the first catalytic zone Z1, are sent to second catalytic zone Z2, and so on up to the $4^{th}$-catalytic zone Z4.

The hydrotreated effluent is withdrawn via the line 11 and sent to a first separator 8 to separate a gaseous stream 20 and a paraffinic liquid stream 19, the gaseous stream being sent to a second separator 9 so as to separate a gaseous stream RG which is recycled via the conduit 13, and a liquid stream which is sent to a final separation step 12. The separator 12 can be used to separate water (not shown), a gaseous stream 22, and a second liquid paraffinic stream 21, a portion 18 of which is recycled, R, via the conduit 16 before being subdivided and sent to the various catalytic zones of the reactor. The other portion of the liquid stream 21 is collected and mixed in the conduit 10 with the liquid stream 19 obtained from the separation 8 for sending to the hydroisomerization step (not shown in FIG. 1), or for recycling.

Figure 2:
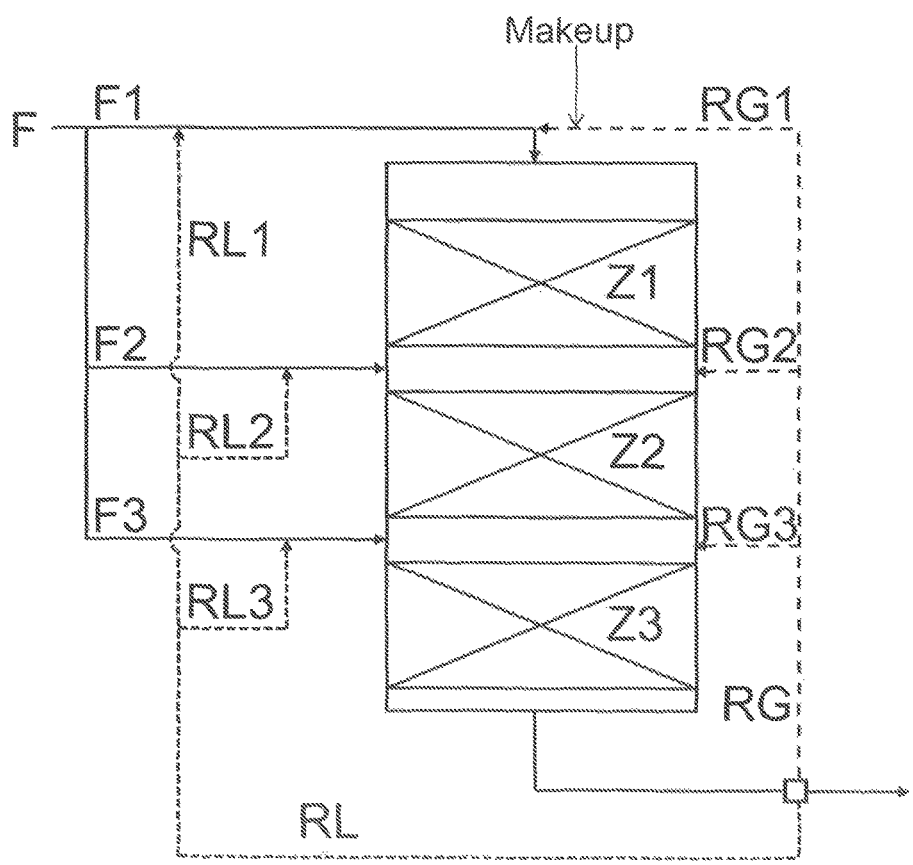

FIG. 2 represents the streams entering and leaving the hydrotreatment reactor. The fresh feed F is divided into various streams F1, F2 and F3 and sent respectively to the zones Z1, Z2 and Z3. The stream of feed F1 enters the catalytic bed of catalytic zone Z1 as a mixture with a gas recycle RG1, a makeup of hydrogen and a liquid recycle RL1. The stream of feed F2, gas recycle stream RG2, and liquid recycle stream RL2 are sent to the catalytic bed of catalytic zone Z2, and stream of feed F3, gas recycle stream RG3, and liquid recycle stream RL2 are sent to the catalytic bed of catalytic zone Z3.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 15/57053, filed Jul. 24, 2015 are incorporated by reference herein.

EXAMPLES

Example 1 (not in Accordance with the Invention)

Example 1 is not in accordance with the invention, because the mass flow of hydrogen sent to the first catalytic zone Z1 represents 35% by weight of the total mass flow of hydrogen used in the hydrotreatment process.

The feed to be treated was a palm oil with the principal characteristics shown in Table 1a. This feed had already undergone a treatment with phosphoric acid and a treatment with bleaching clay using protocols known to the person skilled in the art.

TABLE 1a

| Characteristics of the treated feed (palm oil) | |
| --- | --- |
| Treated feed | Palm oil |
| Density at 15° C. (kg/m³) | 915.5 |
| Oxygen (% by wt) | 11.34 |
| Hydrogen (% by wt) | 12.0 |
| Sulphur (ppm by wt) | 1.7 |
| Nitrogen (ppm by wt) | 1.5 |
| Phosphorus (ppm by wt) | <0.5 |
| Magnesium (ppm by wt) | <0.5 |
| Sodium (ppm by wt) | <0.5 |
| Iron (ppm by wt) | <0.5 |

100 g/h of this feed was to be treated in a hydrotreatment reactor constituted by 2 catalytic beds.

Each catalytic zone was constituted by one bed of catalyst. The catalyst used was identical in the two catalytic zones of the hydrotreatment step and comprised 4% by weight of NiO, 21% by weight of MoO₃ and 5% by weight of P₂O₅ supported on a gamma alumina. Said catalyst had a Ni/Mo atomic ratio equal to 0.4.

The supported catalysts were prepared by dry impregnation of the oxide precursors in solution, then sulphurized in situ prior to the test at a temperature of 350° C. using a straight run gas oil feed supplemented with 2% by weight of sulphur from dimethyldisulphide (DMDS). After in situ sulphurization in the unit under pressure, the feed described in Table 1a, obtained from a renewable source constituted by palm oil, was sent to each of the two catalytic zones.

The method for the preparation of the catalysts does not limit the scope of the invention.

The total palm oil feed (F=100 g/h) was divided into two streams, one stream F1 of 40 g/h injected into the zone Z1, and a second stream of 60 g/h injected into the zone Z2.

The quantity of liquid recycle used was injected integrally with the feed over the zone Z1 at a flow rate RL1=90 g/h.

The gas injected with the feed was entirely composed of hydrogen. This hydrogen was injected as a whole with the two feed streams supplying zones Z1 and Z2, at a flow rate such that at the inlet to each of the catalytic zones, the same ratio was obtained: RG1/F1=RG2/F2=700 Nm³/m³.

Thus, the mass flow rate of hydrogen sent to the first catalytic zone Z1 represented 35% by weight of the total mass flow rate of hydrogen used in the hydrotreatment process.

The total operating pressure was 50 bar rel (5 MPa rel).

Table 1b indicates the flow rates of each of the two streams of feed, as well as the liquid recycle ratios and the degrees of dilution for each of the two catalytic zones.

TABLE 1b

| Operating conditions for hydrotreatment section and characteristics of effluent produced | | |
| --- | --- | --- |
| Parameter | Formula for calculation | Value |
| Flow rate of feed, zone Z1 (F1) (g/h) | | 40.0 |
| Flow rate of feed, zone Z2 (F2) (g/h) | | 60.0 |
| Total flow rate of feed (F) (g/h) | | 100.0 |
| Liquid recycle flow rate (RL1) (g/h) | | 90 |
| Liquid recycle flow rate (RL2) (g/h) | | 0.0 |
| Flow rate of gas, zone Z1 (RG1) (g/h) | | 2.73 |
| Flow rate of gas, zone Z2 (RG2) (g/h) | | 4.10 |
| Liquid recycle ratio zone Z1 (TR1) (g/g) | RL1/F1 | 2.25 |
| Liquid recycle ratio zone Z2 (TR2) (g/g) | (RL1 + RL2)/F2 | 1.5 |
| Dilution ratio zone Z1 (TD1) | (RL1 + RG1)/F1 | 2.32 |
| Dilution ratio zone Z2 (TD2) | (RL1 + RG1 + RL2 + RG2 + F1)/F2 | 2.28 |
| Temperature at inlet, zone Z1 (° C.) | | 230 |
| Temperature at outlet, zone Z2 (° C.) | | 312 |
| Mean temperature (° C.) | | 273 |
| Delta T1 = T, outlet Z1 − T, inlet Z1 | | 83 |
| Delta T2 = T, outlet Z2 − T, inlet Z2 | | 70 |
| Characteristics of effluent produced | | |
| Flow rate of hydrocarbons produced (g/h) | | 81.0 |
| Density at 15° C. (kg/m3) | | 785.5 |
| Oxygen (% by wt) | | <0.2 |

Oxygen was completely eliminated during this hydrotreatment step. A liquid product essentially composed of hydrocarbons in a yield of 81.0% by weight was obtained.

Example 2 (in Accordance with the Invention)

The same feed as in Example 1 was treated in a hydrotreatment reactor constituted by two catalytic zones each comprising the same catalyst as in Example 1. In Example 2 of the invention, the mass flow rate of hydrogen sent to the first catalytic zone Z1 represented 80% by weight of the total mass flow rate of hydrogen used in the hydrotreatment process.

The same protocol for activation of the catalyst by sulphurization was applied, and the total operating pressure was 50 bar rel (5 MPa rel).

Table 2 indicates the flow rates of each of the two streams of feed, as well as the liquid recycle ratios and the degree of dilution for each of the two catalytic zones.

The same quantity of liquid product was recycled (R=90 g/h) but, in contrast to Example 1, part of this recycle was sent to the catalytic zone Z1 (RL1=72 g/h) and part of it was sent to the catalytic zone Z2 (RL2=18 g/h). The nature and the gas flow recycled to the hydrotreatment reactor was generally identical to that of Example 1 (100% hydrogen, RG1=5.46 g/h, corresponding to a ratio of the volume of $H_2$/volume of feed at the reactor inlet of 700 $Nm^3/m^3$). In contrast, this gaseous flow was distributed in a different manner, since the mass flow of hydrogen sent to the first catalytic zone Z1 represented 80% by weight of the total mass flow of hydrogen.

TABLE 2

Operating conditions for the hydrotreatment section
Yield and characteristics of the effluent produced

| Parameter | Formula for calculation | Value |
| --- | --- | --- |
| Flow rate of feed, zone Z1 (F1) (g/h) | | 40.0 |
| Flow rate of feed, zone Z2 (F2) (g/h) | | 60.0 |
| Total flow rate of feed (F) (g/h) | | 100.0 |
| Liquid recycle flow rate (RL1) (g/h) | | 72 |
| Liquid recycle flow rate (RL2) (g/h) | | 18 |
| Flow rate of gas, zone Z1 (RG1) (g/h) | | 5.46 |
| Flow rate of gas, zone Z2 (RG2) (g/h) | | 1.36 |
| Liquid recycle ratio zone Z1 (TR1) (g/g) | RL1/F1 | 1.80 |
| Liquid recycle ratio zone Z2 (TR2) (g/g) | (RL1 + RL2)/F2 | 1.50 |
| Dilution ratio zone Z1 (TD1) | (RL1 + RG1)/F1 | 1.94 |
| Dilution ratio zone Z2 (TD2) | (RL1 + RG1 + RL2 + RG2 + F1)/F2 | 2.28 |
| Temperature at inlet, zone Z1 (° C.) | | 220 |
| Temperature at outlet, zone Z2 (° C.) | | 313 |
| Mean temperature (° C.) | | 269 |
| Delta T1 = T, outlet Z1 − T, inlet Z1 | | 76 |
| Delta T2 = T, outlet Z2 − T, inlet Z2 | | 65 |

Example 3 (in Accordance with the Invention)

The same feed as in Example 1 was treated in a hydrotreatment reactor constituted by two catalytic zones each comprising the same catalyst as in Example 1. In Example 3 of the invention, the mass flow rate of hydrogen sent to the first catalytic zone Z1 represented 100% by weight of the total mass flow rate of hydrogen used in the hydrotreatment process.

The same protocol for activation of the catalyst by sulphurization was applied, and the total operating pressure was 50 bar rel (5 MPa rel).

Table 3 indicates the flow rates of each of the two streams of feed, as well as the liquid recycle ratios and the degrees of dilution for each of the two catalytic zones.

The same quantity of liquid product was recycled (R=90 g/h) but, in contrast to Example 1, part of this recycle was sent to the catalytic zone Z1 (RL1=60 g/h) and part of it was sent to the catalytic zone Z2 (RL2=30 g/h).

The nature and the gas flow rate recycled to the hydrotreatment reactor was generally identical to that of Example 1 (100% hydrogen, RG1=6.83 g/h, corresponding to a ratio of the volume of $H_2$/volume of feed at the reactor inlet of 700 $Nm^3/m^3$). In contrast, this gaseous flow was distributed in a different manner, since all of it was sent to the catalytic zone Z1.

TABLE 3

Operating conditions for the hydrotreatment section
Yield and characteristics of the effluent produced

| Parameter | Formula for calculation | Value |
| --- | --- | --- |
| Flow rate of feed, zone Z1 (F1) (g/h) | | 40.0 |
| Flow rate of feed, zone Z2 (F2) (g/h) | | 60.0 |
| Total flow rate of feed (F) (g/h) | | 100.0 |
| Liquid recycle flow rate (R1) (g/h) | | 60.0 |
| Liquid recycle flow rate (R2) (g/h) | | 30.0 |
| Flow rate of gas, zone Z1 (R1g) (g/h) | | 6.83 |
| Flow rate of gas, zone Z2 (R2g) (g/h) | | 0.00 |
| Liquid recycle ratio zone Z1 (TRL1) (g/g) | RL1/F1 | 1.50 |
| Liquid recycle ratio zone Z2 (TRL2) (g/g) | (RL1 + RL2)/F2 | 1.50 |
| Dilution ratio zone Z1 (TDL1) | (RL1 + RG1)/F1 | 1.67 |
| Dilution ratio zone Z2 (TDL2) | (RL1 + RG1 + RL2 + RG2 + F1)/F2 | 2.28 |
| Temperature at inlet, zone Z1 (° C.) | | 215 |
| Temperature at outlet, zone Z2 (° C.) | | 313 |
| Mean temperature (° C.) | | 266 |
| Delta T1 = T, outlet Z1 − T, inlet Z1 | | 73 |
| Delta T2 = T, outlet Z2 − T, inlet Z2 | | 65 |
| Characteristics of effluent produced | | |
| Flow rate of hydrocarbons produced (g/h) | | 83.0 |
| Density at 15° C. (kg/m3) | | 786.3 |
| Oxygen (% by wt) | | <0.2 |

Examples 1 to 3 demonstrate that implementing the present invention means that a low recycle ratio can be employed in all of the catalytic zones due to application of a high flow rate of hydrogen to the inlet to the first bed, in contrast to Example 1, not in accordance with the invention, in which the hydrogen was distributed over the catalytic beds in a uniform manner and in which the exothermicity was not controlled, the temperature differences between the outlet and inlet for the catalytic beds being too high.

Furthermore, good management of the exothermicity in Examples 2 and 3, in accordance with the invention, mean that a lower mean bed temperature was employed compared with Example 1 which was not in accordance with the invention, which meant that deactivation of the catalyst was reduced, and thus the service life of the catalyst was longer.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the hydrotreatment of a feed obtained from renewable sources to produce paraffinic hydrocarbons which is carried out in the presence of hydrogen in a fixed bed reactor having a plurality of catalytic zones disposed in series and each catalytic zone comprising at least one hydrotreatment catalyst, said process comprising:

a) dividing a liquid feed stream F into a plurality of different part-streams of liquid feed, F1 to Fn, respectively, wherein the number of part-streams of liquid feed is equal to the number of catalytic zones n in said fixed bed reactor, Z1 to Zn, respectively, and n is a whole number in the range of 2 to 10;

b) injecting a first part-stream of liquid feed F1 into a first catalytic zone Z1, and injecting a second part-stream of liquid feed F2 into a second catalytic zone Z2 and so on if n is greater than 2;

c) hydrotreating each part-stream, F1 to Fn, in each catalytic zone, Z1 to Zn, respectively, in the presence of hydrogen at a temperature in the range of 180° C. to 400° C., at a pressure in the range of 0.1 MPa to 15 MPa, at an hourly space velocity in the range of 0.1 $h^{-1}$ to 10 $h^{-1}$, and with a ratio of flow rate of hydrogen to flow rate of liquid feed in the range of 150 to 1500 $Nm^3/m^3$ to produce at least one effluent containing paraffinic hydrocarbons discharged from said reactor, wherein the mass flow rate of hydrogen sent to the first catalytic zone Z1 represents more than 80% by weight of the total mass flow rate of hydrogen used in the hydrotreatment process, hydrotreated product and hydrogen-containing gas are discharged from each catalytic zone, and, except for the nth catalytic zone, the hydrotreated product and hydrogen-containing gas from each catalytic zone are introduced into the next catalytic zone in the series, and the hydrotreated product and hydrogen-containing gas from the nth catalytic zone form said at least one effluent discharged from said reactor;

d) separating said effluent from c) in at least one separation step in order to separate at least one gaseous fraction containing hydrogen and at least one liquid fraction containing paraffinic hydrocarbons;

e) dividing at least a portion of said at least one liquid fraction containing paraffinic hydrocarbons from d) into a plurality of liquid recycle streams, RL1 to RLn, and recycling a first liquid recycle stream RL1 to the first catalytic zone Z1, and recycling a second liquid recycle stream RL2 to the second catalytic zone Z2 and so on if n is greater than 2; and f) optionally dividing at least a portion of said gaseous fraction containing hydrogen from d) into a plurality of gaseous recycle streams, RG1 to RGn, and optionally recycling a first gaseous recycle stream RG1 to the first catalytic zone Z1, and optionally recycling a second gaseous recycle stream RG2 to the second catalytic zone Z2 and so on if n is greater than 2;

wherein each of the catalytic zones has a local recycle ratio which is defined as the weight ratio between (i) the total weight of the liquid recycle stream introduced to the catalytic zone plus any the liquid recycle streams introduced into any previous catalytic zone in the series, if present, and (ii) the part-stream of liquid feed introduced into the catalytic zone, and wherein said local recycle ratio of each catalytic zone is >0 to 2;

wherein the first catalytic zone of the series receives a liquid diluting stream and optionally a gaseous diluting stream, wherein the optional gaseous diluting stream is the first gaseous recycle stream from f);

wherein each of the other catalytic zones, Z2 to Zn, in the series receives liquid and gaseous diluting streams, wherein said liquid diluting streams are: (1) the part-stream(s) of liquid feed streams introduced into each of the previous catalytic zones in the series, if present, (2) the liquid recycle streams from e) introduced into each of the previous catalytic zones in the series, if present, and (3) the liquid recycle stream from e) introduced into the catalytic zone, and said gaseous diluting streams are: (4) the hydrogen-containing gas discharged from the previous catalytic zone in the series, if present, (5) the optional gaseous recycle streams from f) introduced into each of the previous catalytic zones in the series, if present, and (6) the optional gaseous recycle stream from f) introduced into the catalytic zone; and wherein each of the catalytic zones has a local dilution ratio defined as the weight ratio between (I) the total quantity of liquid and gaseous diluting streams introduced into the catalytic zone and (II) the part-stream of liquid feed introduced into the catalytic zone, and wherein said local dilution ratio of each catalytic zone is >0 to less than 4.

2. The process according to claim 1, wherein the liquid feed obtained from renewable sources is selected from vegetable oils, oils from algae or algal oils, fish oils, spent cooking oils, and fats of vegetable or animal origin, and mixtures thereof, and comprises triglycerides, free fatty acids, and/or esters.

3. The process according to claim 1, wherein the mass flow rate of hydrogen sent to the first catalytic zone Z1 represents more than 90% by weight of the total mass flow rate of hydrogen used in the hydrotreatment process.

4. The process according to claim 3, wherein 100% by weight of the total mass flow of hydrogen used in the hydrotreatment process is sent to the first catalytic zone Z1.

5. The process according to claim 1, wherein the local recycle ratio of each of the catalytic zones is >0 to 1.7.

6. The process according to claim 3, wherein the local recycle ratio of each of the catalytic zones is >0 to 1.5.

7. The process according to claim 1, wherein said hydrotreatment catalyst in each catalytic zone comprises at least one metal from group VIII selected from nickel and cobalt, used alone or as a mixture, optionally in association with at least one metal from group VIB selected from molybdenum and tungsten, used alone or as a mixture, and a support selected from the group formed by alumina, silica, silica-aluminas, magnesia, clays and mixtures thereof.

8. The process according to claim 1, wherein separation d) is carried out in a high temperature high pressure separator and wherein said effluent from c) is separated into a gaseous fraction comprising hydrogen, CO, $CO_2$, $H_2S$, light gases, water, and at least some paraffinic hydrocarbons and a liquid fraction containing paraffinic hydrocarbons, wherein said gaseous fraction is then sent to a low temperature high pressure separator to separate said gaseous fraction into a further gaseous fraction comprising hydrogen, CO, $CO_2$, $H_2S$, light gases and water and a further liquid fraction containing paraffinic hydrocarbons.

9. The process according to claim 1, wherein separation d) is carried out in two separation steps, the first separation step being carried out in a low temperature high pressure separator, followed by a second separation step for separation of at least a portion of water formed during hydrodeoxygenation reactions occurring in said hydrotreatment process.

10. The process according to claim 1, wherein said gaseous fraction separated in separation d) is recycled to c).

11. The process according to claim 1, further comprising subjecting at least a portion of the liquid fraction containing paraffinic hydrocarbons obtained from separation d) to hydroisomerization in the presence of a hydroisomerization catalyst to produce a hydroisomerization effluent.

12. The process according to claim 11, wherein said hydroisomerization is performed at a temperature in the range of 150° C. to 500° C., at a pressure in the range of 1 MPa to 10 MPa, at an hourly space velocity in the range of 0.1 h$^{-1}$ to 10$^{-1}$, and at a hydrogen flow rate such that the volume ratio of hydrogen/hydrocarbons is in the range of 70 to 1000 Nm$^3$/m$^3$ of feed.

13. The process according to claim 11, wherein the hydroisomerization catalyst comprises: (a) at least one metal from group VIII selected from platinum activated in its reduced form, palladium activated in its reduced form, nickel in its sulphide form, and cobalt in its sulphide form, and/or (b) at least one metal from group VIB selected from molybdenum and tungsten, and at least one molecular sieve or amorphous mineral support.

14. The process according to claim 11, further comprising subjecting the hydroisomerization effluent to at least one separation step and at least one step for fractionation in order to obtain a gaseous cut, a gasoline cut and at least one middle distillates cut containing kerosene and/or diesel.

15. The process according to claim 1, wherein at least a portion of said gaseous fraction containing hydrogen from d) is divided into a plurality of gaseous recycle streams, RG1 to RGn, and a first liquid gaseous recycle stream RG1 is recycled to the first catalytic zone Z1, and a second gaseous recycle stream RG2 is recycled to the second catalytic zone Z2 and so on if n is greater than 2.

16. The process according to claim 1, wherein the local dilution ratio of each of the catalytic zones is >0 to <3.8.

17. The process according to claim 1, wherein the local dilution ratio of each of the catalytic zones is >0 to <3.5.

18. The process according to claim 1, wherein the local dilution ratio of each of the catalytic zones is >0 to <3.

19. The process according to claim 1, wherein said hydrotreatment process is conducted at a temperature in the range of 200° C. to 350° C., at a pressure in the range of 0.5 to 10 MPa, at an hourly space velocity in the range of 0.1 to 5 h$^{-1}$, and with a ratio of flow rate of hydrogen to flow rate of liquid feed in the range of 400 to 1200 Nm$^3$/m$^3$.

20. The process according to claim 1, wherein the first catalytic zone Z1 has an inlet and an outlet, and the temperature at the inlet to said first catalytic zone Z1 is more than 180° C., and the temperature at the outlet from said first catalytic zone Z1 is less than 350° C.

21. The process according to claim 20, wherein each of the catalytic zones has an inlet and an outlet, and the temperatures at the inlet to each of the catalytic zones following the first catalytic zone is higher than that temperature at the inlet of the preceding catalytic zone.

22. The process according to claim 21, wherein the temperature at the outlet of each of the catalytic zones following the first catalytic zone Z1 is below 400° C.

23. The process according to claim 21, wherein a difference in temperature between the outlet temperature and the inlet temperature for each catalytic zone is in the range 1° C. to 80° C.

24. The process according to claim 1, wherein for catalytic zones Z2 to Zn the flow rate of the part-streams of liquid feed injected into each catalytic zone is a higher proportion of the liquid feed stream F than the flow rate of the part-stream of liquid feed injected into the previous catalytic zone.

* * * * *